Figure 1:
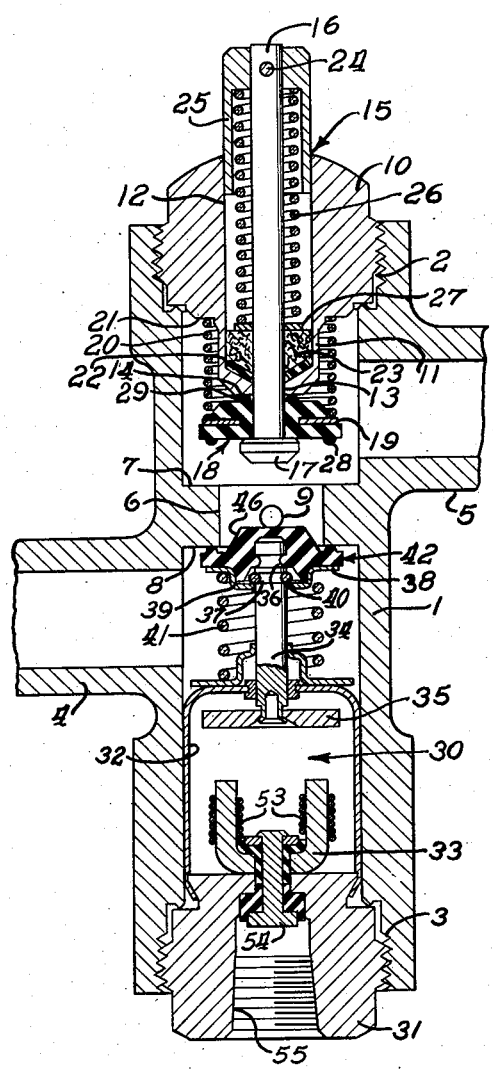

Sept. 1, 1959    E. E. MEUSY    2,902,249
VALVE
Filed July 27, 1953

INVENTOR.
Eugene E. Meusy
BY
Seegert & Schwalbach
Att'ys.

United States Patent Office 2,902,249
Patented Sept. 1, 1959

2,902,249
VALVE

Eugene E. Meusy, Milwaukee, Wis., assignor to Baso Inc., a corporation of Wisconsin Application July 27, 1953, Serial No. 370,330

4 Claims. (Cl. 251—85)

This invention relates to improvements in valves, and more particularly to valves for controlling the flow of fluid, for example, gaseous fuel.

It has been standard practice, in the fuel control valves which have been developed heretofore, to employ disk type valve members which coact with raised annular seats. In order to compensate for a misalinement between the valve and its seat and to insure a proper sealing action, certain valves provide a relatively loose or floating mounting for the valve member.

The prior valves above referred to have not been entirely satisfactory either from a cost standpoint or from an operational standpoint. A valve body utilizing raised valve seats requires special coring for the valve body casting, as well as special machining of the raised valve seat. In addition, the valve structures developed heretofore have utilized a relatively large number of parts including certain screw machine parts. The floating valve disk mounting heretofore provided in certain valves has resulted in jamming of the valve in open position, as well as undesirable sliding of the valve on the seat during closure, the latter resulting in excessive wear on the valve disk facing. Needless to say, jamming of the valve in open position can be very dangerous, particularly where the valve is used to control fuel flow to a burner.

It is a principal object of the present invention to provide an improved valve for controlling fluid flow, which provides improved and more positive sealing, as well as improved capacity, by virtue of the novel valve member and valve seat construction incorporated therein.

Another object of the invention is to provide an improved valve for the control of fluid flow which is constructed to permit the valve member thereof to readily compensate for any misalinement between the face of said valve member and the valve seat, without any danger of jamming the valve member in open position or of causing the valve member to slide on the valve seat.

A more specific object of the invention is to provide an improved valve of the character described having incorporated therein a reciprocatably mounted valve disk provided with a face having a raised annular resilient rib which is adapted to sealingly engage a coacting flat annular valve seat.

A further object of the invention is to provide an improved valve of the character described wherein the valve disk is made of resilient molded material having the sealing rib integral therewith, said valve member having a snug fit on a coaxial stem on which it is carried, the resilience of the said valve member providing sufficient floating action to insure proper sealing in spite of misalinement between the valve member and the valve seat without permitting such looseness as might cause jamming or sliding of the valve member on its seat, said resilience also insuring proper sealing in spite of surface irregularities in said seat.

A further object of the invention is to provide an improved valve of the character described having a pair of spaced coaxial flat valve seats which are alternatively engageable by a single valve member, said valve member being mounted for coaxial reciprocatory movement between said seats and having raised annular sealing ribs on opposite faces thereof for respective coaction with said seats.

Another object of the invention is to provide an improved valve of the character described wherein the resilient valve member is easily assembled and readily replaceable, said valve member having a snap-on type connection with its stem.

A further object of the invention is to provide an improved valve of the character described in which the valve member is provided with a retaining and stiffening washer which not only locks the valve member on its stem but also serves as a force transmitting member between a loading spring and said valve member, the construction being such that the retaining washer also serves as a spring centering means.

More specifically, it is the object of the invention to insure proper seating of the valve member by forming the latter with a central hub which projects axially a substantial distance beyond the plane of the sealing surface of the annular rib in the valve member face, said valve member being formed with an axial recess projecting thereinto from the side opposite its face and into said hub, said recess receiving a valve stem which extends to the bottom of said recess and terminates within said hub beyond the plane of the sealing surface of said annular rib.

A further object of the invention is to provide an improved valve of the character described which utilizes substantially fewer parts than similar prior valves, and which by reason of its flat annular valve seats does not require expensive coring for the valve body casting, or expensive machining of said body in the formation of the valve seats.

Other objects and advantages of the invention will appear as the description proceeds, reference being had to the accompanying drawing.

Figure 2:
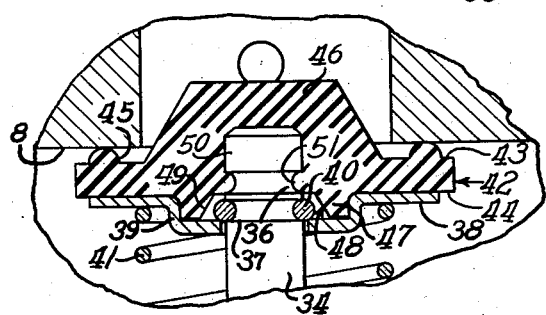

In the accompanying drawings:

Figure 1 is a fragmentary axial sectional view of a manually resettable electromagnetically controlled safety shut-off valve constructed in accordance with the invention; and Figure 2 is an enlargement of a portion of Figure 1.

Referring more particularly to Figure 1 of the drawing, in which is illustrated a safety shut-off valve of the general type shown in Charles V. Hildebrecht Patent Number 211,446, issued April 19, 1938, the numeral 1 indicates a tubular valve casing, the opposite ends of which are counterbored and internally threaded as at 2 and 3. The body 1 is formed with an inlet connection 4 and an outlet connection 5 which are axially offset. Between the inlet connection 4 and the outlet connection 5 the body 1 is formed with a portion of the reduced internal diameter 6 the opposite ends of which are surrounded by coaxial flat annular valve seats 7 and 8. The portion of the reduced diameter 6 may be formed with a radial passage 9 which may affect communication with the pilot fuel supply line (not shown).

A valve resetting mechanism 15 is threaded into the portion 2 of the body 1 said mechanism including a fitting 10 having an axial boss 11 at its inner end and having an axial bore 12 extending therethrough, said bore 12 having a reduced diameter portion 13 at the inner end of the boss 11. The boss 11 has a flat annular end face 14 surrounding the bore portion 13. A reset stem 16 extends axially within the bore 12 and the bore portion 13 and has an enlarged head 17 at its inner end. A flow interruption disk 18 of resilient molded material, for example polyacrylate synthetic elastomeric material, is axially bored and has a slidable sealing fit on the stem 16 between the head 17 and the boss 11. A stiffening washer 19 is molded coaxially into the disk 18, as shown, and has a peripheral portion exposed for engagement by one end of the helical compression spring 20 which coaxially surrounds the boss 11 and has its other end in abutment with an annular shoulder 21 on the fitting 10 at the base of the boss 11. The loading spring 20 urges the disk 18 downwardly against the head 17 and into sealing engagement therewith when the stem 16 is in the raised position shown.

A sealing washer 22 surrounds the stem 16 at the bottom of the main portion of the bore 12, said washer being overlayed with packing 23 which also surrounds the stem 16. Fixed to the outer end of the stem 16, as by a pin 24, is a cup-shaped reset button 25 having a telescopic sliding fit within the bore 12, said button projecting from the bore 10 as shown. A coiled compression spring 26 surrounds the stem 16 within the bore 12 and has one end in abutment with the button 25, the other end of said spring being in abutment with a washer 27 which overlays the packing 23. The spring 26 urges the button 25, stem 16 and disk 18 upwardly with greater force than that with which the spring 20 urges said parts downwardly.

The disk 18 is formed in its lower face with an integral annular sealing rib 28 which may be semicircular in transverse cross-section. The diameter of the rib 28 is such that the latter is adapted to sealingly engage the flat annular face 7 when moved thereto. The opposite side of the disk 18 is formed with a similar annular sealing rib 29 of smaller diameter which rib is adapted to sealingly engage the flat annular face 14 around the stem 16. When the disk 18 is in its normal retracted position shown, the rib 29 provides an effective seal around the stem 16 at the face 14, and the stem head 17 sealingly engages the surface portion of the disk 18 in abutment therewith to prevent any leakage around said stem. The force of the spring 26 overcomes the force of the spring 20 and urges the stem 16 outwardly to effect the sealing engagement of the rib 29 with the face 14 and sealing engagement of the head 17 with the lower face of the disk 18.

During resetting of the illustrated valve, the button 25 and stem 16 are depressed thereby compressing the spring 26 and permitting the spring 20 to urge the disk 18 downwardly to seat the rib 28 on the flat annular face 7 as the head 17 moves below said face into the bore portion 6. The sliding fit of the disk 18 on the stem 16 is sufficiently snug so that a positive seal is at all times maintained thereby around the stem 16 and so that said disk is held relatively firmly. There is, however, sufficient stock in the disk 18 so that the resilience of said disk permits the latter to compensate for slight misalinement between the planes of the surface of the rib 28 and of the face 7, as well as between the planes of the surface of the rib 29 and of the face 14, thereby insuring a positive seal during engagement. The resilience of the disk 18 also permits the latter to conform to any surface irregularities in the face 7, to further insure a positive seal.

Removably threaded into the portion 3 of the valve body 1 is an electromagnetic safety shut-off assembly 30 comprising a fitting 31 to which is fixed a cup-shaped casing or hood 32. An electromagnet 33 is fixed to the fitting 31 within the hood 32 and is provided with a coil 53 having one end grounded to the fitting 31, and having the other end connected to an insulatably mounted terminal tip 54. The terminal tip 54 has a portion exposed within an internally threaded bore 55 extending axially into the outer end of the fitting 31. The bore 55 is adapted to receive the connector nut assembly of a concentric type thermocouple lead (not shown) to effect a series circuit connection between the thermocouple and the electromagnet coil 53. A thermocouple and lead of the type with which the improved valve is adapted to be connected, is shown in Oscar J. Leins Patent Number 2,126,564, issued August 9, 1938.

A valve stem 34 extends through the inner end wall of the hood 32 and is mounted for coaxial reciprocatory movement. Within the hood 32 an armature 35 is fixed to the stem 34, said armature being adapted to coact with the electromagnet 33, being movable from the released position shown to an attracted position (not shown) in engagement with the pole faces of the electromagnet 33. The opposite end of the stem 34 is formed with a circumferential groove 36 which may be semicircular in transverse section, and inwardly of the groove 36 said stem is formed with a circumferential groove 37. A retaining washer 38 has a loose fit on the stem 34 and is formed with a cup-shaped portion 39. A retaining ring 40 is crimped or otherwise fixed in the groove 37 and limits the axial movement of the washer 38 beyond its point of engagement with said ring as shown. A coiled compression spring 41 surrounds the stem 34, and one end of said spring fits around the cup-shaped portion 39 of the washer 38 and engages the flat peripheral portions of said washer as shown. The other end of the spring 41 abuts the inner end wall of the hood 32 as shown, and said spring urges the washer 38, stem 34 and the armature 35 axially upwardly as viewed in Figure 1.

A valve disk 42 of resilient molded material, for example polyacrylate synthetic elastomeric material, is carried by, and has a snap-on connection with the stem 34. The disk 42 has opposite parallel faces 43 and 44 (see Figure 2), the face 43 being formed with an annular sealing rib 45 which may be semicircular in transverse cross-section. The rib 45 is adapted to sealingly engage the seat 8 as shown. The face 43 is formed with a coaxial frusto-conical boss or hub 46 which projects from said face a distance substantially greater than the spacing between said face and the plane of the sealing surface of the annular rib 45. The disk 42 is formed in the face 44 with a coaxial cylindrical hub or boss 47. The hub 47 is formed with an axial recess 48 having a frusto-conical outer end portion 49 and a generally cylindrical inner portion 50, the inner end of which projects axially beyond the plane of the sealing surface of the rib 45 as shown. Between the portions 49 and 50 the recess 48 is provided with an annular rib 51. The upper end portion of the stem 34 is snugly received in the recess portion 50, and the annular rib 51 is snugly received in the annular groove 36 of the said stem.

On assembling the disk 42 to the stem 34, said disk is snapped into position on the end of said stem, this being permitted by the resilience of the material from which said disk is made. The retaining washer 38 is then moved toward the disk 42 to the position shown, wherein the cylindrical cup-shaped portion 39 snugly surrounds the hub 47 to confine the latter radially, and the peripheral portion of said washer is positioned flat against the face 44.

The retaining washer 38 serves a number of purposes. The radial confinement of the hub 47 prevents radial spreading of said hub, which spreading would enlarge the recess 48 and permit displacement of the rib 51 from the groove 36. Thus, the washer 38 maintains the positive interlocking engagement between the rib 51 and groove 36, and the disk 42 is thereby firmly held on the stem 34. The washer 38 also receives the force exerted by the spring 41 and distributes said force around the periphery of the disk 42 to insure uniform sealing force around the rib 45. In addition, the cup-shaped portion 39 of the washer 38 serves as a centering means for the spring 41 as shown.

There is sufficient stock in the disk 42 and looseness of fit of the washer 38 on the stem 34 to permit the resilience of the disk 42 to compensate for any misalinement of the planes of sealing surface rib 45 and of the flat annular seat 8 of the valve body 1, as well as to compensate for any surface irregularities in the seat 8. While the resilience of the rib 42 permits such compensation, the said disk is nevertheless firmly held on the stem 34, so that there is no such undesirable looseness as might tend to cause jamming or sliding of the disk 42 of the seat 8. Jamming or sliding is further prevented by the fact that the stem 34 projects into the hub 46 beyond the plane of the sealing surface of the rib 45, so that any pivoting of the disk 42 on the stem 34 is about a point on said stem substantially in the plane of the sealing surface of the rib 45.

The disk 42 is reset to open position (not shown), and the armature 34 is reset into engagement with the electromagnet 33 by depression of the reset button 25 sufficiently to cause the head 17 of the stem 16 to engage the boss 46 of the disk 42 and push the latter downwardly until armature 35 engages the electromagnet 33. As previously pointed out, during this operation the spring 20 pushes the flow interrupter disk 18 downwardly to move the annular rib 28 into sealing engagement with the flat annular seat 7, to thereby prevent any flow to the outlet 5 while permitting flow through the bore 9. Upon release of the button 25, the spring 26 overcomes the force spring 20, pulling the disk 18 and stem 16 and button 25 upwardly to the normal position shown, and thereby causing the annular rib 29 to sealingly engage the flat annular seat 14.

The positive seal afforded by the improved valve is of particular importance in fuel control valves, since failure to positively shut off the fuel flow at the required time can be extremely dangerous. Another advantage of the improved valve is that fluid flow past the flat annular seats 7 and 8 is not only more efficient than fluid flow past raised valve seats, thus providing higher capacity for a given seat size, but fluid flow past flat valve seats also tends to keep said seats clear of foreign particles, whereas a raised type of seat creates a well in which foreign particles can collect.

In the manufacture of the valve body 1 the use of the flat annular valve seats 7, 8 and 14 effects substantial cost savings as compared with the manufacture of a similar valve body utilizing raised annular valve seats. Simpler and therefore less expensive coring procedures may be used in the molding of the casting for the valve body 1. In addition, the flat annular valve seats can be more quickly and less expensively machined than can comparable raised valve seats. In addition to the cost savings effected in the manufacture of the valve body 1, the improved valve disks 18 and 42 require fewer associated movable parts, and the parts that are used, for example, the washer 19 and 38, can be formed by simple stamping operations rather than by expensive machining operations.

The form of the invention selected for illustration is for the purpose of disclosure only and is not intended to define the limits or scope of the invention. Various changes and modifications may be made without departing from the spirit of the invention, and all of such changes are contemplated that may come within the scope of the claims.

What is claimed as the invention is:

1. In a valve for controlling fluid flow: a valve stem; a valve member of resilient molded material having a hub formed with an axial stem-receiving recess; and connections between said stem and said valve member comprising an annular shoulder on said stem and an annular shoulder in said valve member recess, said shoulders providing an interlock to prevent relative axial movement of said valve member and stem and thereby hold said valve member in operative position on the stem, and a retaining member having an annular portion snugly surrounding said hub to prevent radial spreading of the latter and thereby retain said shoulders in said interlocked engagement preventing relative axial movement of said valve member and stem.

2. In a valve for controlling fluid flow: a valve stem; a valve member of resilient molded material having a face formed with a hub, the latter having an axial stem-receiving recess; and connections between said stem and said valve member comprising an annular shoulder on said stem and an annular shoulder in said valve member recess, said shoulders providing an interlock to hold said valve member in operative position on the stem, and a retaining member having an annular portion snugly surrounding said hub and prevent radial spreading of the latter and thereby preventing disengagement of said interlocked shoulders, said retaining member also having an outwardly directed flange engaging said valve member face around said hub and adapted to be engaged by a loading spring.

3. In a valve for controlling fluid flow: a valve stem; a retaining and stiffening washer having a loose fit on said stem and having a cup-shaped central portion; stop means on said stem adjacent one end of said stem engaged by the cup-shaped portion of the washer to limit the movement of the latter toward said stem end; a valve member of resilient molded material having a face formed with a hub, said hub having an axial stem-receiving recess; and connections between said stem end and said valve comprising a shoulder on said stem between said stem end and said stop means, and a shoulder in said valve member recess, said shoulders providing an interlock to hold said valve member in operative position on the stem, the cup-shaped portion of said washer snugly receiving said valve member hub and preventing radial spreading of the latter to thereby prevent disengagement of said interlocked shoulders, the peripheral portions of said washer engaging said valve member face around said hub and being adapted to be engaged by a loading spring.

4. In a valve for controlling fluid flow: a valve body having a flat annular valve seat; a coaxial valve stem; a valve member of resilient molded material having a face formed with an annular sealing rib which is adapted to sealingly engage said seat, said valve member face also having a central hub projecting axially beyond said sealing rib, said valve member having an opposite face formed with a central hub, there being an axial stem-receiving recess in said last-mentioned hub extending into said first-mentioned hub; and connections between said stem and said valve member comprising an annular shoulder on said stem, an annular shoulder in said valve member recess, and a retaining member having an annular portion snugly surrounding said last-mentioned hub, said valve stem being snugly fitted in said recess and projecting into said first-mentioned hub portion beyond the plane of the sealing surface of said annular rib, said shoulders providing an interlock to hold said valve member in operative position on the stem, and said retaining member preventing radial spreading of said hub and thereby preventing disengagement of said interlocked shoulders, the resilience of said valve member and the disposition of the end of said stem with respect to the sealing surface of said rib permitting said valve member to adjust and conform itself to said seat for fluid-tight sealing engagement therewith.

References Cited in the file of this patent

UNITED STATES PATENTS

| | | |
|---|---|---|
| 645,696 | Topp | Mar. 20, 1900 |
| 863,449 | Richardson | Aug. 13, 1907 |
| 1,841,354 | Bowen | Jan. 19, 1932 |
| 1,859,590 | Koppl | May 24, 1932 |
| 1,939,912 | McNeal | Dec. 19, 1933 |
| 2,223,699 | Norgren | Dec. 3, 1940 |
| 2,233,649 | Stahl | Mar. 4, 1941 |

(Other references on following page)

UNITED STATES PATENTS

| | | | |
|---|---|---|---|
| 2,315,948 | Esnard | Apr. 6, | 1943 |
| 2,397,269 | Kelly | Mar. 26, | 1946 |
| 2,413,869 | Hamer | Jan. 7, | 1947 |
| 2,496,679 | Saurer | Feb. 7, | 1950 |
| 2,506,837 | Kachner | May 9, | 1950 |
| 2,578,194 | Matthews | Dec. 11, | 1951 |
| 2,590,674 | Bodey | Mar. 25, | 1952 |
| 2,638,929 | Delany | May 19, | 1953 |
| 2,641,278 | Eplett | June 9, | 1953 |
| 2,645,238 | Thornberry | July 14, | 1953 |

FOREIGN PATENTS

| | | | |
|---|---|---|---|
| 624,639 | Great Britain | June 14, | 1949 |
| 1,025,455 | France | Jan. 21, | 1953 |